United States Patent
Verma et al.

(10) Patent No.: US 10,992,743 B1
(45) Date of Patent: Apr. 27, 2021

(54) DYNAMIC CACHE FLEET MANAGEMENT

(71) Applicant: Amazon Technologies, Inc., Seattle, WA (US)

(72) Inventors: Prashant Verma, Seattle, WA (US); Ronil Sudhir Mokashi, Mercer Island, WA (US); Karthik Uthaman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 16/579,648

(22) Filed: Sep. 23, 2019

(51) Int. Cl.
*H04L 29/08* (2006.01)
*G06F 11/14* (2006.01)
*G06F 12/0813* (2016.01)

(52) U.S. Cl.
CPC ...... *H04L 67/1008* (2013.01); *G06F 11/1464* (2013.01); *G06F 12/0813* (2013.01); *H04L 67/2842* (2013.01); *G06F 2201/84* (2013.01)

(58) Field of Classification Search
CPC ............. H04L 67/1008; H04L 67/2842; G06F 12/0813; G06F 11/1464; G06F 2201/84
See application file for complete search history.

(56) References Cited

U.S. PATENT DOCUMENTS

| | | | | |
|---|---|---|---|---|
| 8,032,707 B2* | 10/2011 | Iyigun | ................. | G06F 12/0866 711/118 |
| 8,135,914 B2* | 3/2012 | Iyigun | ................. | G06F 12/0862 711/118 |
| 8,489,815 B2* | 7/2013 | Iyigun | ................. | G06F 12/0871 711/118 |
| 9,032,151 B2* | 5/2015 | Iyigun | ................. | G06F 12/0866 711/118 |
| 9,348,752 B1* | 5/2016 | Parakh | ................. | G06F 11/1446 |
| 10,216,949 B1* | 2/2019 | McKelvie | ........... | G06F 21/6227 |
| 10,387,313 B2* | 8/2019 | Iyigun | ................... | G06F 12/128 |
| 10,743,036 B1* | 8/2020 | Farris | ................... | H04N 21/251 |
| 10,771,541 B2* | 9/2020 | Aborn | ................. | H04L 67/1008 |
| 10,805,652 B1* | 10/2020 | Uthaman | ......... | H04N 21/23103 |
| 2010/0070701 A1* | 3/2010 | Iyigun | ................. | G06F 11/1441 711/113 |
| 2010/0070747 A1* | 3/2010 | Iyigun | ................. | G06F 12/0866 713/2 |
| 2011/0314202 A1* | 12/2011 | Iyigun | ................. | G06F 12/0866 711/3 |

(Continued)

*Primary Examiner* — David R Lazaro
(74) *Attorney, Agent, or Firm* — Knobbe, Martens, Olson & Bear, LLP

(57) ABSTRACT

A content delivery system dynamically manages a content cache fleet by expanding or shrinking the size of the cache fleet to anticipate and/or respond to changes in demand for cached content. The content delivery system can consider various demand-based parameters when determining when and how to scale the cache fleet, including the overall demand (expected or observed) for all content available for delivery by the content delivery system, the demand for a subset of content or individual content items relative to the demand for other subsets of content or individual content items, etc. When content servers are removed from the cache fleet, snapshots of the content caches of the content servers can be stored to a persistent data store, and then restored to content servers when content servers are added to the cache fleet.

20 Claims, 9 Drawing Sheets

(56) References Cited

U.S. PATENT DOCUMENTS

| | | | |
|---|---|---|---|
| 2012/0173824 A1* | 7/2012 | Iyigun | G06F 12/0871 |
| | | | 711/144 |
| 2013/0198456 A1* | 8/2013 | Harrison | G06F 11/1441 |
| | | | 711/118 |
| 2015/0242321 A1* | 8/2015 | Iyigun | G06F 12/0833 |
| | | | 711/135 |
| 2017/0264702 A1* | 9/2017 | Dao | H04L 67/1097 |
| 2020/0244758 A1* | 7/2020 | Enguehard | H04L 67/327 |
| 2020/0305042 A1* | 9/2020 | Alam | H04W 28/06 |

* cited by examiner

DYNAMIC CACHE FLEET MANAGEMENT

BACKGROUND

Computing devices may be used to provide services in a network environment. For example, content providers can use a distributed system of server computing devices to deliver content (such as web sites, web content, or other digital data) to users. Such distributed systems are sometimes referred to as content delivery networks ("CDNs") or content delivery systems. In addition to providing redundancy and load balancing for the original sources of the content ("origin servers"), the server computing devices of a content delivery system can efficiently provide similar or identical content to client computing devices from locations that are closer to the client computing devices than the origin servers are to the client computing devices.

A content delivery system may determine whether a requested content item is available in a cache of (or accessible to) a server computing device of the content delivery system. If so, the server computing device can provide the requested content item to the client directly. If not, the server computing device may first retrieve the content item from the origin server, and provide the retrieved content item to the client. The retrieved content item may also be stored in the cache so that it is available to fulfill future requests for the same content item. The process of returning content not presently maintained in a cache is sometimes referred to as a "cache miss." Cache misses are generally undesirable, in that they result in delays to fulfill client requests (e.g., due to the time required to retrieve content from the origin server) as well as increased load on the origin server itself.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
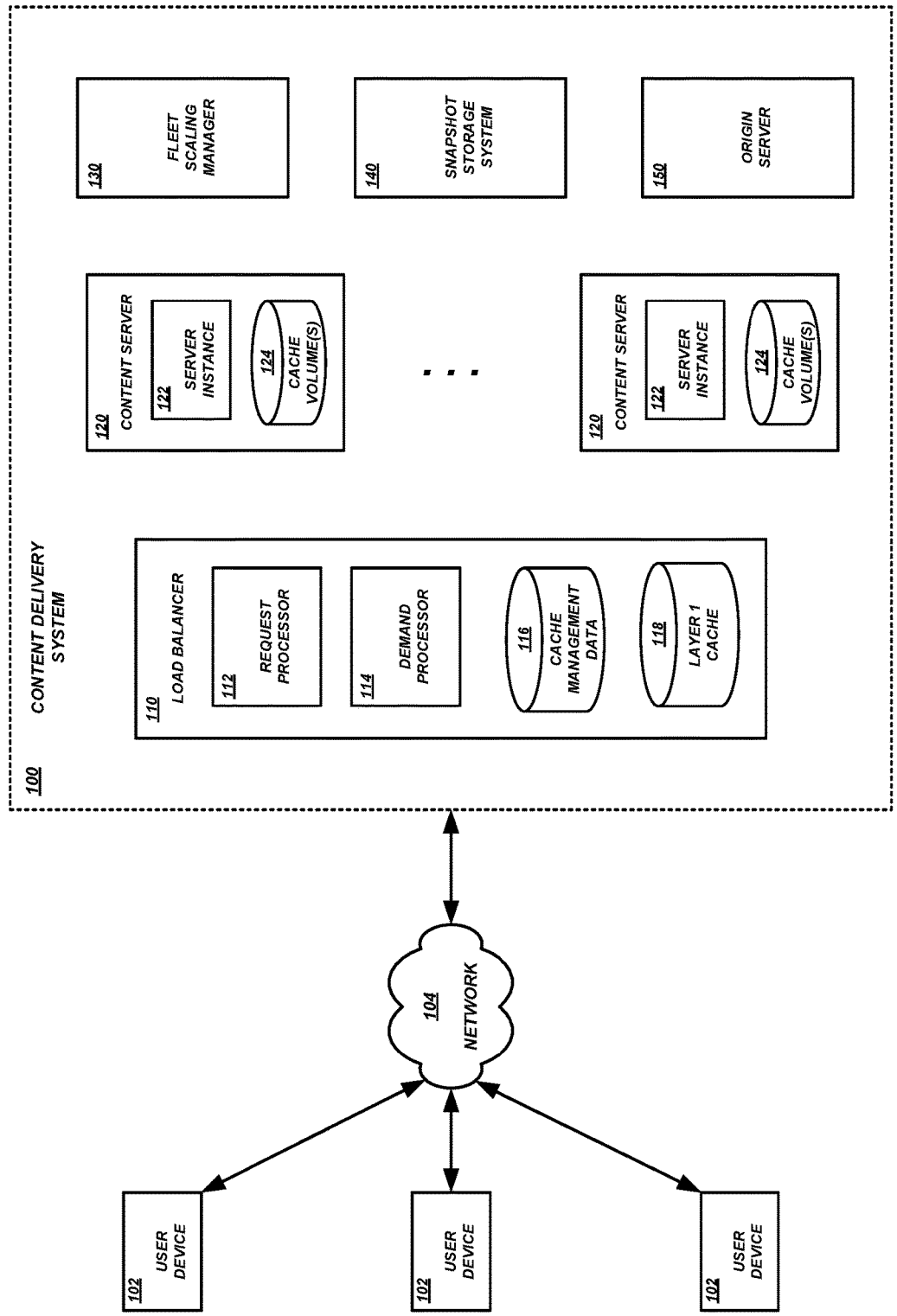
FIG. 1 is a block diagram of a content delivery system configured to dynamically manage a cache fleet according to some embodiments.

The present disclosure is directed to dynamic management of cache fleets for delivery of content. A content delivery system can dynamically scale its cache fleet (e.g., by expanding or shrinking the size of the cache fleet) to anticipate and/or respond to changes in demand for cached content. The content delivery system can consider various demand-based parameters when determining when and how to scale the cache fleet, including the overall demand (expected or observed) for all content available for delivery by the content delivery system, the demand for a subset of content or individual content items relative to the demand for other subsets of content or individual content items, etc.

Some conventional computing resource provider systems are configured to dynamically scale a computing fleet based on demand for the computing resources provided by the fleet. For example, additional computing resources may be added to the fleet in the form of additional server computing devices, additional virtual machines running on server computing devices, etc. Such systems therefore scale the overall computing power of the systems, rather than the size and makeup of content caches. Some content delivery systems that include content caches are configured based on a particular level of expected demand, such as the peak demand expected by the system for all content that the system delivers. For example, the total amount of persistent data storage available for caching content is chosen based on performance considerations for times of peak demand. However, such systems tie up unneeded computing resources during off-peak times.

Some aspects of the present disclosure relate to dynamically scaling the cache fleet of a content delivery system. During periods of low demand (either observed or expected), the content delivery system can store snapshots of low-demand portions of the content cache, such as individual cache volumes of server computing devices, to a snapshot data store or separate data storage system. Then, server computing devices on which the low-demand portions of the content cache were hosted can be removed from the cache fleet to be freed up for other computing tasks, to reduce the cost of operating the fleet during off-peak times, etc. The content delivery system, which determines which server computing device is to handle each request for content based on an association of the requested content with the server computing device, can dynamically update the association of content items with server computing devices to account for the removal of server computing devices from the fleet. In a similar manner, during times of high demand, the content delivery system can add server computing devices to the cache fleet and mount snapshotted cache volumes to the added server computing devices. The content delivery system can dynamically update the association of content items with server computing devices to account for the addition of the server computing devices to the fleet. In this way, the overall cache space of the content delivery system can be dynamically scaled larger and smaller to respond to—or anticipate—the overall demand on the content delivery system.

Additional aspects of the present disclosure relate to determining demand for individual content items. The content delivery system can track requests for individual content items and determine a demand (e.g., a relative "popularity") of the individual content items available for delivery by the content delivery system. The content items that are associated with the highest degree of demand may be cached at server computing devices that are always available (or are available the greatest amount of time), while content items that are associated with lower degrees of demand (e.g., are less "popular") may be cached at server computing devices that are removed from the fleet during periods of low overall demand. In this way, the content delivery system can be dynamically scaled smaller in an intelligent manner that maintains the availability of high-demand content items in cache while reducing the overall size of the case. Similarly, the content delivery system can be dynamically scaled larger in an intelligent manner that provides availability of lower-demand content items in cache when the overall size of the system can support and benefit from caching this lower-demand content.

Although aspects of some embodiments described in the disclosure will focus, for the purpose of illustration, on particular examples of content, caches, demand metrics, and scaling procedures, the examples are illustrative only and are not intended to be limiting. In some embodiments, the techniques described herein may be applied to additional or alternative content, caches, demand metrics, scaling procedures, and the like. Various aspects of the disclosure will now be described with regard to certain examples and embodiments, which are intended to illustrate but not limit the disclosure.

Content Delivery System Network Environment

With reference to an illustrative embodiment, FIG. 1 shows an example network environment in which aspects of the present disclosure may be implemented. In some embodiments, as shown, the network environment may include a content delivery system 100 and various user computing devices that request and receive content from the content delivery system 100. The content delivery system 100 and user computing devices 102 may communicate with each other via one or more communication networks 104. In some embodiments, a communication network 104 (also referred to simply as a "network") may be a publicly-accessible network of linked networks, possibly operated by various distinct parties, such as the Internet. In some cases, the network 104 may be or include a private network, personal area network, local area network, wide area network, global area network, cable network, satellite network, cellular data network, etc., or a combination thereof, some or all of which may or may not have access to and/or from the Internet.

The content delivery system 100 may include various components to provide content delivery services. As shown, the content delivery system 100 may include a load balancer 110, multiple content servers 120, a fleet scaling manager 130, and a snapshot storage system 140. An origin server 150 may be part of the content delivery system 100, or may be separate from the content delivery system 100.

The load balancer 110 may include a request processor 112 that receives a content request from a user device 102 and determines which content server 120 will service the request. The load balancer 110 may also include a demand processor 114 that analyzes data regarding content requests and determines an actual or expected demand for individual content items. As described in greater detail below, the determined demand for individual content items can be used to change the location at which content items are cached. The load balancer 110 may also include a cache management data store 116 that stores data used by the request processor 112 to select which content server 120 will service any given request. The load balancer 110 may also include a first layer cache 118 that can be used to cache content items with the greatest degree of demand (or expected demand) so that such content items can be returned to requesting user computing devices 102 without the request processor 112 forwarding requests for the content items to content servers 120.

The components of the load balancer 110 may be implemented on one or more physical server computing devices. In some embodiments, the load balancer 110 (or individual components thereof, such as the request processor 112, the demand processor 114, the cache management data store 116, and/or the first layer cache 118) may be implemented on one or more host devices, such as blade servers, midrange computing devices, mainframe computers, or any other computing device configured to provide computing services and resources. For example, a single host device may execute or otherwise host one or more request processors 112, demand processors 114, cache management data stores 116, first layer caches 118, some combination thereof, etc. The load balancer 110 may include any number of such hosts. In some embodiments, a load balancer 110 may include fewer, additional, and/or alterative components. In some embodiments, a content delivery system 100 may include multiple load balancers 110. For example, the content delivery system 100 may include a fleet of load balancers 110, and the fleet may scale larger and smaller based on demand for content from the content delivery system 100, according to a schedule, etc. In some embodiments, data used by a load balancer 110 may be stored on—and accessed from—a separate server or system. For example, the cache management data store 116 may be implemented on a separate data server accessible by one or more load balancers 110, fleet scaling managers 130, etc.

Content servers 120 may include various components to provide content caching and request servicing features. As shown, a content server 120 may include one or more server instances 122 and one or more cache volumes 124. Server instances 122 may include executable components that manage the processing of requests, determining whether requested content is available in a cache volume 124, returning content that is cached, and retrieving content from an origin server 150 that is not cached. Cache volumes 124 may include persistent storage devices in which content may be stored, snapshots may be restored, etc.

The content delivery system 100 may include a fleet of any number of content servers 120, and the number of active content servers 120 in the fleet may change over time based on the dynamic cache fleet management processing of the content delivery system 100. Individual content servers 120 may be implemented on one or more physical server computing devices. In some embodiments, a content server 120 (or individual components thereof, such as the server instance(s) 122 and/or the cache volume(s) 124) may be implemented on one or more host devices, such as blade servers, midrange computing devices, mainframe computers, or any other computing device configured to provide computing services and resources. For example, a single host device may execute or otherwise host one or more server instances 122 and one or more cache volumes 124.

The fleet scaling manager 130—also referred to simply as the "scaling manager" for convenience—may be configured to manage the dynamic scaling of the fleet of content servers 120. For example, the scaling manager 130 may configure additional content servers 120 with server instances 122 and restored cache volumes 124 during period of high demand. The scaling manager 130 may also save snapshots of cache volumes 124 to a snapshot storage system 140 and remove content servers 120 from the fleet during periods of lower demand.

The scaling manager 130 and snapshot storage system 140 may be implemented on one or more host devices, such as blade servers, midrange computing devices, mainframe computers, or any other computing device configured to provide computing services and resources. For example, a single host device may execute or otherwise host a scaling manager 130 and a snapshot storage system 140. As another example, the snapshot storage system 140 may be hosted on a separate computing device—or set of computing devices—than the scaling manager 130.

User computing devices 102—also referred to simply as "user devices" for convenience—may be any computing device configured to request and receive content from the content delivery system 100. For example, a user device 102 may be may include a desktop computing device, a laptop computing device, a tablet computing device, a mobile media player, an electronic reader, a mobile phone configured with network access and program execution capabilities (e.g., a "smart phone"), a wearable computing device configured with network access and program execution capabilities (e.g., a "smart watch" or "smart eyewear"), a television configured with network access and program execution capabilities (e.g., a "smart TV"), a video game console, a set top box, a server computing device, or any other computing device or appliance.

Figure 2A:
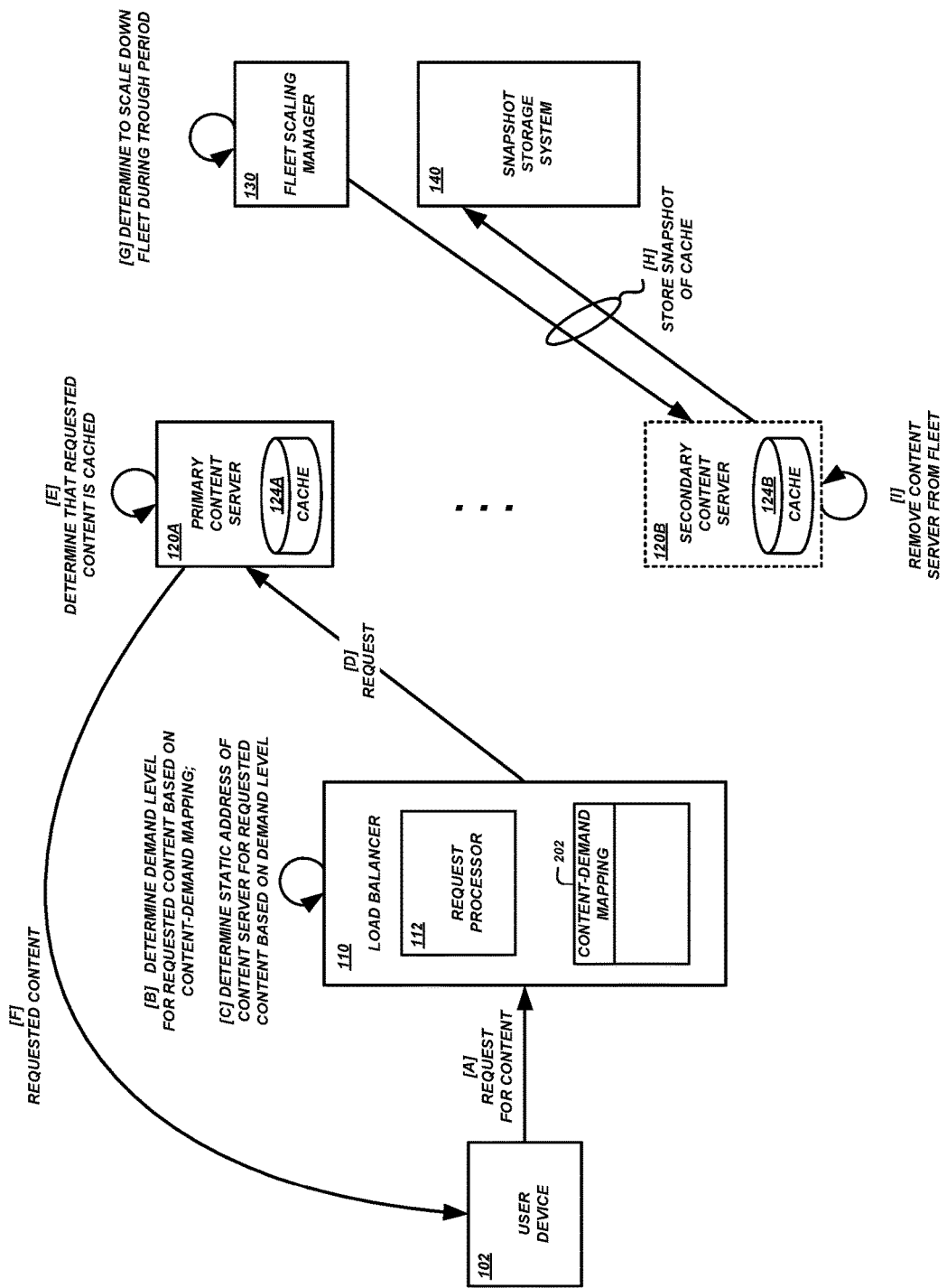
FIG. 2A and FIG. 2B are block diagrams of illustrative data flows and interactions during content request processing and content server fleet scaling according to some embodiments.

FIG. 2A illustrates example interactions and data flows occurring in connection with a request for content, and subsequent scaling of the fleet of content servers. As shown, a user device 102 may request content from the content delivery system 100 at [A]. For example, a user may cause the user device 102 to initiate a request for a web page, video file, audio file, executable object, or the like. The request may be sent to the content delivery system 100 via the network 104.

The load balancer 110 may receive the request, and the request processor 112 may identify a content server 120 to service the request. The request processor 112 may determine at [B] a level of demand for the requested content item. Illustratively, the fleet of active content servers 120 may be organized into multiple groups, wherein individual groups correspond to individual levels of demand. Requests for content items in a high level of demand (e.g., a level labeled "1") may be serviced by a group of content servers 120 configured to maintain caches of such high-demand content and otherwise service requests for such content. Primary content server 120A is an example of such a content server. Requests for content items in a lower level of demand (e.g., a level labeled "2") may be serviced by a different group of content servers 120, and so on. Secondary content server 120B is an example of a content server that services requests for content items in a lower level of demand than primary content server 102A. The level of demand for individual content items (or groups thereof, such as content items associated with a particular origin server 150) may be identified by content-demand mapping data 202, which may be accessed in a data store such as the cache management data store 116. Once the request processor 112 determines the level of demand—and thus the group of content servers 120—the request processor 112 may determine the particular content server 120 that is to service the request.

At [C], the request processor 112 may use a mapping function configured to map content items to content servers 120 that are currently active in the cache fleet of the content delivery system 100. For example, the mapping function may be a consistent hashing function that takes as input a content item identifier such as a file name, a uniform resource identifier or "URI" (e.g., a uniform resource locator or "URL"), some portion thereof, or some other identifier derived therefrom. The consistent hashing function may generate output data from which a content server 120 can be identified, such as an internet protocol or "IP" address, a host name, a cache volume identifier, or the like. In the illustrated example, the request processor 112 uses a mapping function for the level of demand of the requested content item to determine which content server associated with that level of demand is to service the current request. The mapping function may generate, as output, the IP address of the primary content server 120A.

At [D], the request processor 112 can send the request to the identified content server 120A associated with the requested content item. At [E], the primary content server 120A can determine whether the requested content item is present in the cache volume 124A of the primary content server 120A. If so, the cached content item is sent to the user device 102 at [F]. Otherwise, if there is a cache miss, the content item is obtained from the origin server 150, stored in the cache volume 124A, and send to the user device 102.

At some point after the request (e.g., in response to the request, according to a predetermined or dynamically determined schedule, etc.), the demand processor 114 can determine whether the level of demand for the content item has changed. For example, after a period of time, few or no more requests for the content item may have been received, and the demand for the content item may be lower with respect to other content items than it was when the user device 102 requested the content item at [A]. As another example, the user device's 102 request at [A] may be the latest in a large number of recent requests for the content item, and the demand for the content item may be higher with respect to other content items than it was previously. The demand processor 114 may update the level of demand associated with the content item by modifying content-demand mapping data 202 in the cache management data store 116.

In some embodiments, requested content is initially mapped to a particular level of demand. Illustratively, requested content may be mapped to the highest level of demand if the cache for the highest level of demand is not full, the second-highest level of demand if the cache of the highest level of demand is full but the cache of the second-highest level of demand is not full, and so on. As additional content is requested and a cache for a particular level of demand becomes full, a mechanism is used to replace existing content in the cache. For example, the least-recently used or "LRU" content in the cache is replaced by the most-recently added content. In this case, the LRU content may be mapped to the next-highest level of demand. The content-demand mapping data 202 may be updated accordingly.

In some embodiments, the demand processor 114 may periodically or continuously analyze data regarding requests received for content items. The demand processor 114 may determine a demand metric for each of the content items (or a subset thereof) based on the request data. For example, the demand metric may be a raw number of requests received over a period of time, such as within the past n units of time, where n is some number and the units are minutes, hours, days, weeks, or the like. As another example, the demand metric may represent a trend, such as an increase or decrease in a rate of requests for the content item over a period of time. As yet another example, the metric may be a composite of multiple data elements, such as a weighted request rate based on the number of requests per unit of time, the trend in requests, the prior value of the demand metric for the content item, etc. The example demand metrics described herein are illustrative only, and are not limiting or exhaustive of the demand metrics that may be used. The demand processor 114 may use the demand metrics to categorize individual content items into levels of a multi-level demand hierarchy. For example, content items may be ranked based on the demand metrics associated with each content item. A first quantity or percentage may be assigned to a first demand level, a second quantity or percentage may be assigned to a second demand level, and so on. As another example, content items with demand metrics satisfying a demand-level criterion, such as a threshold value, may be assigned to a first demand level, while content items with demand metrics satisfying a different demand-level criterion may be assigned to a second demand level, and so on.

After the demand processor 114 determines a change in the demand level for a content item (e.g., the content item previously requested at [A]), the demand processor 114 can update the content server associated with the content item so that a different content server—in a group assigned to the new demand level for the content item—processes requests for the content item in the future. For example, the demand processor 114 may update content-demand mapping data 202 stored in the cache management data store 116 to reflect the new demand level for the content item. The mapping function for the new demand level can be used to determine the particular content server (e.g., secondary content server 120B) assigned to the content item, within the group of content servers assigned to the new demand level. The demand processor 114 can notify the secondary content server 120B to obtain the content item from the origin server 150 and store it in the cache volume 124B of the secondary content server 120B so that it is available the next time the content item is requested. In some embodiments, rather than instructing the secondary content server 120B to perform such a pre-caching operation, the next request from a user device 102 for the content item may be sent to the secondary content server 120B (e.g., due to the updated content-demand mapping data 202 for the content item), a cache miss may occur because the secondary content server 120B has not received any requests for the content item, and the secondary content server 120B may obtain the content item from the origin server 150 at that time.

At [G], the fleet scaling manager 130 may determine to scale down the size of the fleet of content servers. Illustratively, the determination may be based on a current or expected level of demand on the content delivery system 100, a predetermined or dynamically determined schedule, etc. The fleet scaling manager may determine to remove servers assigned to requests for relatively low-demand content (e.g., secondary server 120B) from the fleet to scale down the fleet.

At [H], the fleet scaling manager 130, the content servers being removed from the fleet, or some other component of the content delivery system 100 may generate snapshots of the volumes of the content caches for the servers being removed from the fleet (e.g., the cache volume(s) 124B). The snapshots may be stored to the snapshot storage system 140. In this way, the content of the cache volumes may be preserved such that when the fleet is later scaled up and new content servers are added the fleet, the new content servers do not start with empty caches. Instead, their caches may already be populated with the content that was cached on the servers previously removed from the fleet during a prior down-scaling operation.

At [I], the secondary server 120B may be removed from the fleet. Additional details regarding scaling down and scaling up a fleet of content servers are shown in FIGS. 3-7 and described in greater detail below.

Figure 2B:
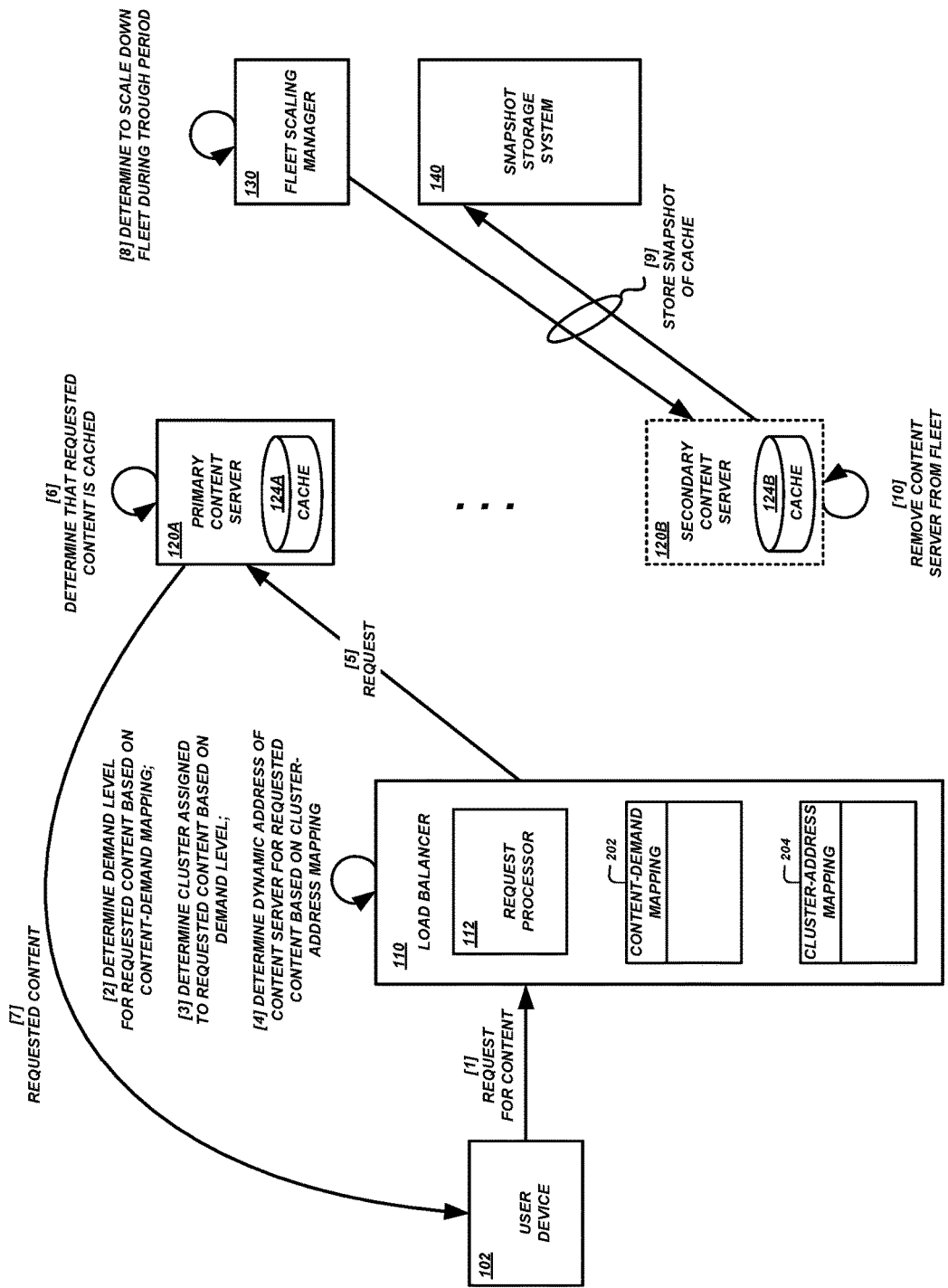

FIG. 2B illustrates example interactions and data flows occurring during servicing a request for content using a content server that was added to the fleet with a dynamically-assigned IP address, rather than an IP address statically or otherwise persistently associated with the cache volume (s) of the content server.

As shown, a user device 102 may request content from the content delivery system 100 at [1]. The load balancer 110 may receive the request, and the request processor 112 may identify a content server 120 to service the request. The request processor 112 may determine at [2] a level of demand for the requested content item.

At [3], the request processor 112 may use a mapping function configured to map content items to cache volumes, or to cache volume clusters, that are currently active in the cache fleet of the content delivery system 100. For example, the mapping function may be a consistent hashing function used for degree of demand determined for the requestee content item, as discussed above with respect to FIG. 2A. In this case, the consistent hashing function may generate output data from which a cache volume cluster can be identified, such as a unique identifier of the cluster.

At [4], the request processor can use cluster-address mapping data 204 to determine the IP address of the server to which the cache volume cluster determined above is mounted. Illustratively, the cluster-address mapping data 204 may be part of the cache management data 116, and may be updated as new servers are added to the fleet and dynamically assigned IP addresses from a pool of available IP addresses, as discussed in greater detail below. In the illustrative example, the request processor 112 may determine that the cache volume cluster is mounted to the primary content server 120A.

At [5], the request processor 112 can send the request to the primary content server 120A. At [6], the primary content server 120A can determine whether the requested content item is present in the cache volume 124A of the primary content server 120A. If so, the cached content item is sent to the user device 102 at [7]. Otherwise, if there is a cache miss, the content item is obtained from the origin server 150, stored in the cache volume 124A, and send to the user device 102.

At [8], the fleet scaling manager 130 may determine to scale down the size of the fleet of content servers. In the illustrated example, the fleet scaling manager 130 may determine to remove the secondary content server 120B from the fleet.

At [9], the fleet scaling manager 130, the content servers being removed from the fleet, or some other component of the content delivery system 100 may generate snapshots of the volumes of the content caches for the servers being removed from the fleet (e.g., the cache volume(s) 124B). The snapshots may be stored to the snapshot storage system 140.

At [10], the secondary server 120B may be removed from the fleet. In some embodiments, the IP address that was dynamically assigned to the secondary 120B may be returned to the pool of available IP addresses to be used during a subsequent scaling-up process. Additional details regarding scaling down and scaling up a fleet of content servers are shown in FIGS. 3-7 and described in greater detail below.

The example content servers, interactions, and scaling procedures shown in the figures and described herein are illustrative only, and are not intended to be limiting or exhaustive of the content servers, interactions, and scaling procedures that may be implemented in a content delivery system 100. For example, although only a primary content server 120A and secondary content server 120B are shown in FIGS. 2A and 2B, in some embodiments there may be three, four, five, ten, one hundred, or more individual content servers. The content servers may be divided into demand-level-specific groups or "sub-fleets" of servers, or there may be a single server for each level of demand.

In some embodiments, a content delivery system 100 may have a fleet of content servers 120 divided into three sub-fleets, with each sub-fleet corresponding to one of three levels of demand. Content requests may be serviced by particular servers within a sub-fleet depending on the level of demand of the requested content, mapping data in the cache management data 116, the output of a mapping function, or some combination thereof. The fleet scaling manger 130 may add additional sub-fleets of content servers such that there are four or more sub-fleets of content servers corresponding to four levels of demand (e.g., during periods of observed or expected higher demand). In some embodiments, the fleet scaling manager may add individual content servers to existing sub-fleets to expand capacity for the existing sub-fleets. In some embodiments, the fleet scaling manager 130 may remove sub-fleets from the fleet of content servers 120, or remove individual content servers from particular sub-fleets, to achieve a scaling goal. For example, the scaling goal may be a desired capacity of the content fleet (e.g., during periods of observed or expected lower demand).

Dynamic Fleet Scaling

Figure 3:
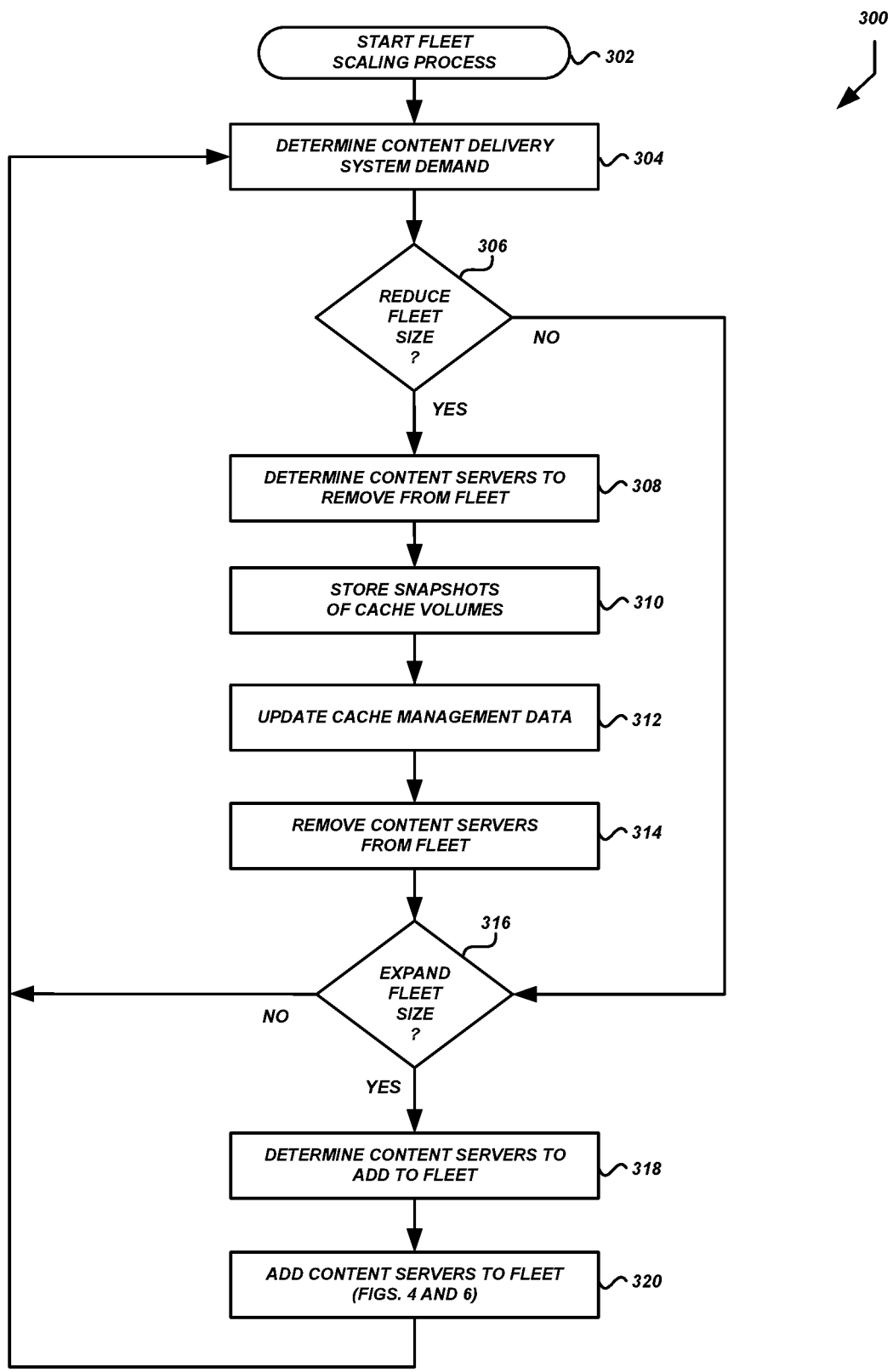
FIG. 3 is a flow diagram of an illustrative process for dynamically managing the scaling of a cache fleet according to some embodiments.

FIG. 3 is a flow diagram of an illustrative process 300 that may be executed by a scaling manager 130 to manage the dynamic scaling of a fleet of content servers 120 of a content delivery system 100. The process 300 begins at block 302. The process 300 may begin in response to an event, such as when the scaling manager 130 begins operation, or on a predetermined or dynamically-determined schedule. When the process 300 is initiated, a set of executable program instructions stored on one or more non-transitory computer-readable media (e.g., hard drive, flash memory, removable media, etc.) may be loaded into memory (e.g., random access memory or "RAM") of a computing device. For example, fleet scaling instructions 850 shown in FIG. 8 may be loaded into memory 846 of the scaling manager 130 and executed by one or more processors 840. In some embodiments, the process 300 or portions thereof may be implemented on multiple processors, serially or in parallel.

At block 304, scaling manager 130 can determine the overall demand on the content delivery system 100. The demand may be a measurement of demand observed at the time block 304 is executed, or a measurement of demand observed over a period of time leading up to execution of block 304 (e.g., over n units of time). For example, the scaling manager 130 or some other component of the content delivery system 100 may determine the number of content requests received by the content delivery system 100, the number of user devices 102 actively requesting the content, the total computing resource usage of the fleet of active content servers 120, some other measurement of demand, or some combination thereof. As another example, the scaling manager 130 or some other component of the content delivery system 100 may determine a measurement of demand (similar to those discussed above) that is expected to occur at a particular point in time or over a future period of time (e.g., over the next n units of time).

At decision block 306, the scaling manager 130 can determine whether to reduce the size of the active fleet of content servers 120. The determination may be based on the measurement of demand determined above. For example, if the level of demand satisfies a reduction criterion, such as falling below a demand threshold, then the scaling manger 130 may determine to reduce the size of the active fleet of content servers 120 by removing content servers 120 from the fleet. The process 300 may then proceed to block 308. Otherwise, if the level of demand fails to satisfy the reduction criterion, then the process 300 may proceed to block 316, where the scaling manager 130 may determine whether to expand the size of the active fleet of content servers 120.

In some embodiments, the scaling manager 130 may not determine to reduce the size of the active fleet based on a measurement of demand directly, but may instead determine to reduce the size of the active fleet based on a schedule. The content delivery system 100 may experience varying periods of demand, including periods peak demand, periods of trough demand, and periods in between peak and trough demand. The periods may occur on a predictable schedule, and the scaling manager 130 may adjust the size of the active fleet of content servers 120 based on the predictable schedule. For example, when a period of peak demand is ending or is about to end, or when a period of trough demand is starting or is about to start, the scaling manager 130 may determine to reduce the size of the active fleet.

At block 308, the scaling manager 130 can determine which content servers 120 are to be removed from the active fleet. The determination may be based on one or more characteristics of the content items cached at—or otherwise associated with—each content server 120 in the active fleet. In some embodiments, the scaling manager 130 may determine that content servers 120 associated with content items having a lowest level of demand are to be removed from the active fleet. If additional content servers 120 are to be removed from the active fleet (e.g., the size of the active fleet is to be reduced by an amount greater than the number of content servers 120 associated with the lowest level of demand), then the scaling manager 130 may determine that content servers 120 associated with the n lowest levels of demand are to be removed from the active fleet, wherein n is some number. The scaling manager 130 may determine the value of n based on the number of content servers 120 associated with each level of demand, and the overall number of content servers 120 to be removed from the active fleet.

At block 310, the scaling manager 130 can initiate the storage of snapshots of the cache volumes currently mounted to the content servers 120 being removed from the active fleet. The snapshots may be stored at a snapshot storage system 140 configured to store data in persistent storage. The content delivery system 100 may store a snapshot of a cache volume of a content server 120 prior to—or as part of—removing the content server 120 from the active fleet because the content of the cache volume itself may be an important resource that is to be preserved and potentially added back to the content delivery system 100. Advantageously, the content of the cache volume itself, when added back to the content delivery system 100, may provide value and performance improvements above and beyond the computing power alone provided by adding a content server 120 to the active fleet. Thus, when a content server 120 is added back to the active fleet, the cache volume can be restored from the snapshot storage system 140 and the content delivery system 100 can provide a greater level of performance than if a content server 120 is added with an empty cache such that there is a cache miss the first time each content item associated with the newly-added content server 120 is requested.

In some embodiments, individual content servers 120 may include a cluster of multiple cache volumes. By using multiple smaller cache volumes instead of a single large cache volume, the performance of the content servers 120 may be improved even if the total storage space of the multiple smaller cache volumes is the same or similar as that of the single large cache volume. For example, individual cache volumes may have a maximum throughput. If each content server 120 has only a single cache volume, the volume throughput may cause a bottleneck. However, by splitting a large cache volume into multiple smaller cache volumes, each with their own independent throughput, the overall performance of the content server 120 can be improved without a reduction in total storage capacity. To maintain consistency after snapshots of the cache volumes of a content server 120 are stored and then restored to an active content server 120, the cache volumes can be handled as a single unit, referred to herein as a cache volume cluster, or simply as a "cache cluster" for convenience.

At block 312, the scaling manager 130 can update information in the cache management data store 116 to reflect the content servers 120 being removed from the active fleet. In some embodiments, various levels of demand associated with different content servers 120 or groups of content servers 120 can be re-allocated among the content servers 120 remaining in the active fleet. For example, a fleet of content servers 120 may originally have three groups of content servers 120: one group for content with a high level of demand (labeled "level 1"), a second group for content with a medium level of demand (labeled "level 2"), and a third group for content with a low level of demand (labeled "level 3"). The scaling manager 130 may remove the content servers 120 assigned to level 3 group from the active fleet, leaving the content servers 120 assigned to the level 1 and level 2 groups. However, each content item that is available for delivery by the content delivery system 100 may need to be associated with a content server 120 for purposes of balancing the load of content request handling. In this case, the scaling manager 130 may associate level 3 with one or more of groups of content servers 120 remaining in the fleet by updating a table in the cache management data store 116. Then, when a request is received for a content item associated with a level 3 demand, the request processor 112 can determine the group of content servers 120 assigned to handle requests for content in level 3, evaluate a mapping function for that group to identify a particular content server 120, and forward the request to the identified content server 120. In this way, each content item available for delivery by the content delivery system 100 may continue to be associated with—and handled by—a content server 120 in the active fleet, even when the makeup of the active fleet changes (e.g., when the content server 120 previously associated with the content item is removed).

At block 314, the content servers 120 designated for removal from the active fleet can be removed. Removal may include deleting data stored on the content servers 120, redeploying the servers 120 to a different system (e.g., a different content delivery system), or the like.

At decision block 316, the scaling manager 130 can determine whether to expand the active fleet of content servers 120. The determination may be based on the measurement of demand determined above at block 304. For example, if the measurement of demand satisfies an expansion criterion, such exceeding a demand threshold, then the scaling manager 130 may determine that content servers 120 are to be added to the active fleet. The process 300 may proceed to block 318. Otherwise, if the measurement of demand fails to satisfy the expansion criterion, then the scaling manager 130 may determine that no content servers 120 are to be added to the active fleet. The process 300 may return to block 304 to determine another measurement of demand. In some embodiments, the process 300 may instead terminate if the scaling manager 130 determines that the active fleet is to be neither expanded nor reduced in size based on the measurement of demand determined at block 304.

In some embodiments, the scaling manager 130 may not determine to expand the size of the active fleet based on a measurement of demand directly, but may instead determine to expand the size of the active fleet based on a schedule. For example, when a period of peak demand is starting, or when a period of trough demand is ending, the scaling manager 130 may determine to expand the size of the active fleet.

At block 318, the scaling manager 130 can determine which cache volumes are to be restored from the snapshot storage system 140 and mounted to new content servers 120 added to the active fleet. The determination may be based on one or more characteristics of the content items included in the snapshots. In some embodiments, the scaling manager 130 may determine that snapshots of cache volumes comprising content items having a highest level of demand with respect to content items in cache volumes of other snapshots are to be used when adding content servers 120 to the active fleet. For example, if the highest level of demand represented in the snapshot data store is level 3, with additional servers at levels for and lower, then the scaling manager 130 may determine to restore the snapshots of cache volumes comprising content items at level 3. If additional content servers 120 are to be added to the active fleet (e.g., the size of the active fleet is to be expanded by an amount greater than the number of content servers 120 associated with the highest level of demand among snapshots), then the scaling manager 130 may determine that snapshots of content volumes associated with the n highest levels of demand are to be added to the active fleet, wherein n is some number. The scaling manager 130 may determine the value of n based on the number of content servers 120 associated with each level of demand, and the overall number of content servers 120 to be added to the active fleet.

Figure 4:
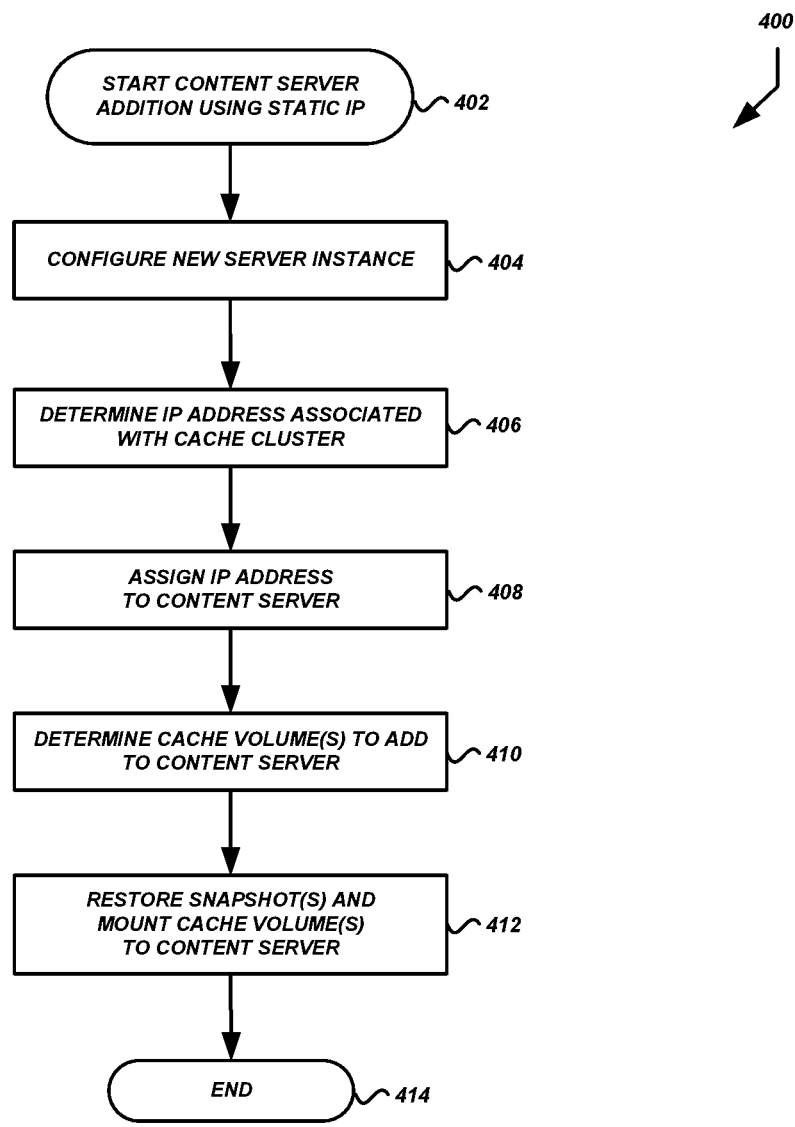
FIG. 4 is a flow diagram of an illustrative process for restoring a cache snapshot into an active cache fleet using a static address according to some embodiments.
Figure 6:
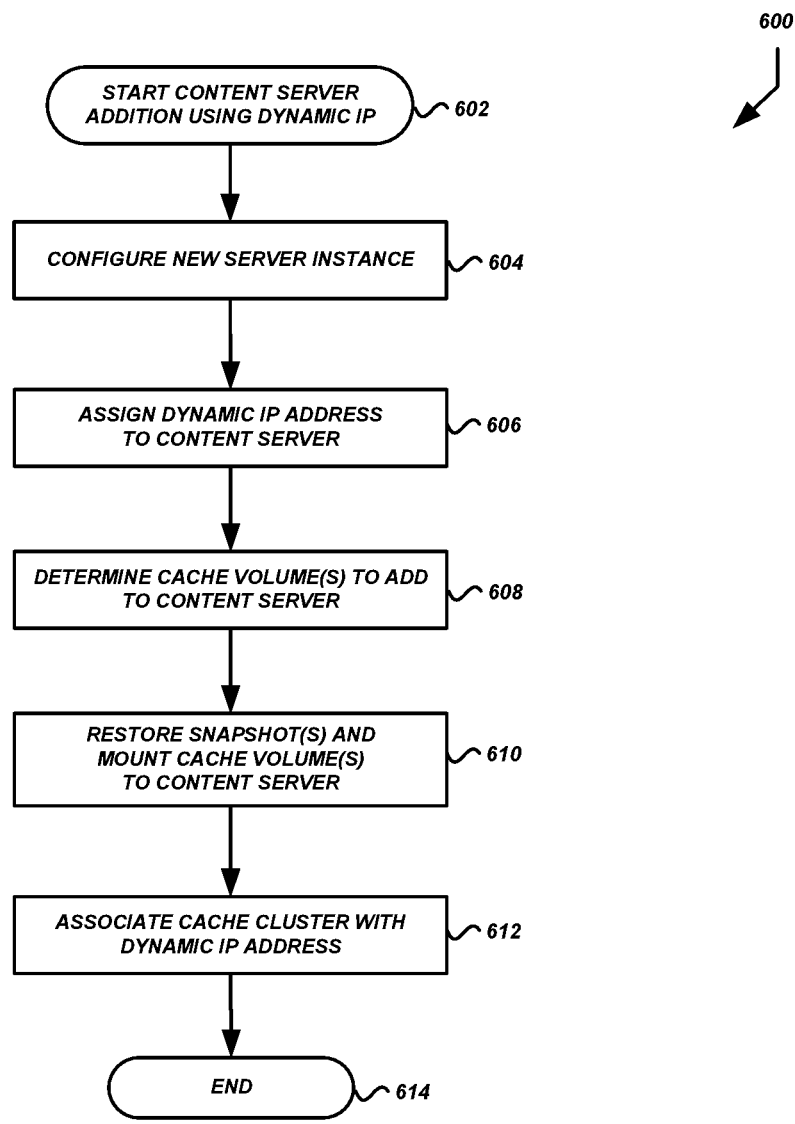
FIG. 6 is a flow diagram of another illustrative process for restoring a cache snapshot into an active cache fleet using a dynamic address according to some embodiments.

At block 320, the scaling manager 130 can configure new content servers 120 to be added to the active fleet, and restore the snapshots identified above to the new content servers 120. Restoring a snapshot to a content server 120 may include mounting the cache volume or cache cluster, stored in the snapshot, to a content server 120, and then making the content server 120 available to the load balancer 110 for use in handling requests for content items associated with content server 120. In some embodiments, new content servers 120 may be added using IP addresses that are persistently associated with the cache clusters that are mounted to the new content servers 120. An example process for adding content servers 120 in this manner is illustrated in FIG. 4. In some embodiments, new content servers 120 may be added using dynamically determined IP addresses, and the cache clusters that are mounted to the new content servers 120 can be associated with the IP addresses in the cache management data store 116. An example process for adding content servers 120 in this manner is illustrated in FIG. 6.

Adding a Content Server Using a Static IP Address

FIG. 4 is a flow diagram of an illustrative process 400 that may be executed by a scaling manager 130 to add a content server 120 to a fleet of content servers 120 of a content delivery system 100. The content server 120 may be added at least in part so that it can serve content from a cache cluster (or individual cache volume) that was previously snapshotted and stored in the snapshot data store 140.

Figure 5:
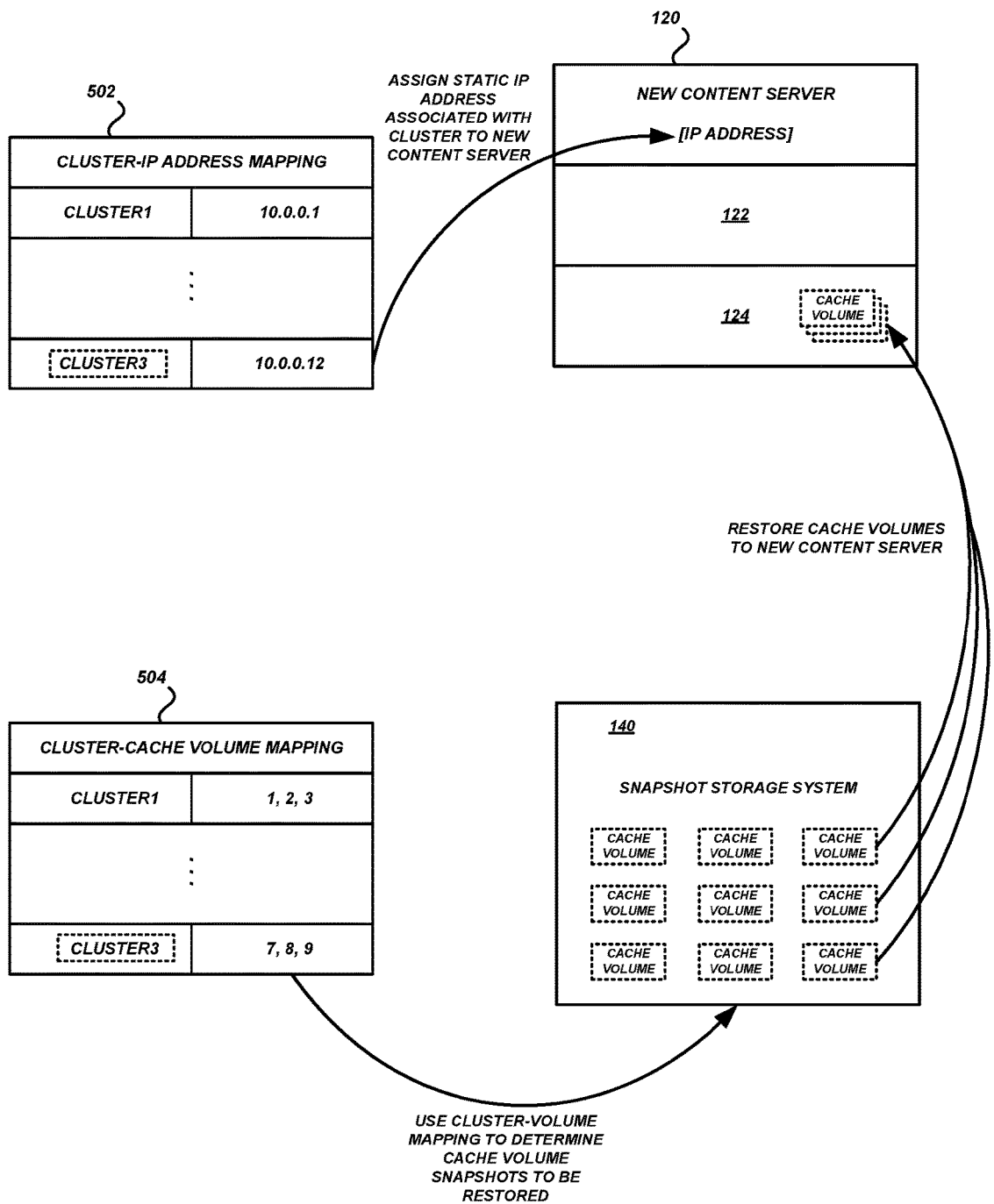
FIG. 5 is a block diagram of illustrative data flows and interactions occurring during dynamic management of a cache fleet according to some embodiments.

Portions of FIG. 4 will be described with further reference to FIG. 5, which illustrates various components and data stores that may be used during the process 400.

The process 400 begins at block 402. The process 400 may be part of—or initiated by—process 300 described above. For example, the process 400 may be executed at block 320. Thus, the executable instructions for process 300 may include instructions to execute process 400 as a subroutine of process 300. In some embodiments, process 400 may be a separate process executed by separate computing devices than process 300. In such cases, when the process 400 is initiated, a set of executable program instructions stored on one or more non-transitory computer-readable media (e.g., hard drive, flash memory, removable media, etc.) may be loaded into memory (e.g., random access memory or "RAM") of a computing device. For example, fleet scaling instructions 850 shown in FIG. 8 may be loaded into memory 846 of the scaling manager 130 and executed by one or more processors 840. In some embodiments, the process 400 or portions thereof may be implemented on multiple processors, serially or in parallel.

At block 404, scaling manager 130 can configure a server instance 122 for a content server 120 to be added to the active fleet for servicing requests associated with a particular cache cluster (or a particular cache volume). Configuring a server instance 122 may include installing software, configuring settings, and the like.

At block 406, the scaling manager 130 can determine an IP address that is associated with the cache cluster for which the content server 120 is being configured. The cache cluster may be assigned an IP address such that the content of the cache cluster may be accessible using the same IP address regardless of the particular content server 120 to which the cache cluster is mounted. Thus the same IP address may be used to access the cache cluster even after a snapshot of the cache cluster is generated and stored, the prior content server 120 is removed from the active fleet, and the cache cluster is later restored to a different content server 120. In some embodiments, as shown in FIG. 5, the content delivery system 100 may maintain IP-address-to-cache-cluster mapping data 502 that records the mapping of IP addresses to cache cluster identifiers. A record of the IP-address-to-cache-cluster mapping data 502 may indicate the particular IP address that is to be used for the current cache cluster.

At block 408, the scaling manager 130 can assign the IP address—determined above—to the content server 120. When a request is subsequently received for a content item that is cached in—or otherwise assigned to—the cache cluster, the request processor 112 may use a mapping function (e.g., a consistent hash function) to determine the IP address of the content server 120 that is to service the request. Because the same IP address is used regardless of the specific content server 120 to which the cache volumes of the cache cluster are mounted, the request processor 112 may therefore identify the correct content server 120 for servicing the request even after the cache cluster has been snapshotted, removed from the active fleet, and restored to the active fleet on a different content server 120 one or more times.

At block 410, the scaling manager 130 determine which cache volume(s) to mount to the content server 120. In some embodiments, as shown in FIG. 5, cache-cluster-to-cache-volume mapping data 504 may specify which cache volumes are in the cache cluster to be added. The scaling manager 130 may read the corresponding data (e.g., one or more records) from the cache-cluster-to-cache-volume mapping data 504 to determine which cache volumes are to be mounted to the content server 120. In some embodiments, a single cache volume is to be mounted to the content server 120 rather than a cluster of cache volumes. In such embodiments, there may be no cache-cluster-to-cache-volume mapping data 504, or the scaling manager 130 may not use such data.

At block 412, the scaling manager 130 can mount the determined cache volume(s) to the content server 120. As shown in FIG. 5, snapshots of the determined cache volumes may be obtained from the snapshot data store 140, and the volumes stored in the snapshots can be restored and mounted to the content server 120 to create the content cache 124 used by the content server 120 to service requests for content items associated with the cache cluster.

The process 400 may terminate at block 414.

Adding a Content Server Using a Dynamic IP Address

FIG. 6 is a flow diagram of an illustrative process 600 that may be executed by a scaling manager 130 to add a content server 120 to a fleet of content servers 120 of a content delivery system 100. In contrast to process 400 described above, process 600 may use an IP address that is dynamically selected from a pool of available IP addresses, rather than an IP address that is specifically mapped for use with the cache cluster being restored. Portions of FIG. 6 will be described with further reference to FIG. 7, which illustrates various components and data stores that may be used during the process 600.

The process 600 begins at block 602. The process 600 may be part of—or initiated by—process 300 described above. For example, the process 600 may be executed at block 320. Thus, the executable instructions for process 300 may include instructions to execute process 600 as a subroutine of process 300. In some embodiments, process 600 may be a separate process executed by separate computing devices than process 300. In such cases, when the process 600 is initiated, a set of executable program instructions stored on one or more non-transitory computer-readable media (e.g., hard drive, flash memory, removable media, etc.) may be loaded into memory (e.g., random access memory or "RAM") of a computing device. For example, fleet scaling instructions 850 shown in FIG. 8 may be loaded into memory 846 of the scaling manger 130 and executed by one or more processors 840. In some embodiments, the process 600 or portions thereof may be implemented on multiple processors, serially or in parallel.

At block 604, scaling manager 130 can configure a server instance 122 for a content server 120 to be added to the active fleet for servicing requests associated with a particular cache cluster (or a particular cache volume). Configuring a server instance 122 may include installing software, configuring settings, and the like.

Figure 7:
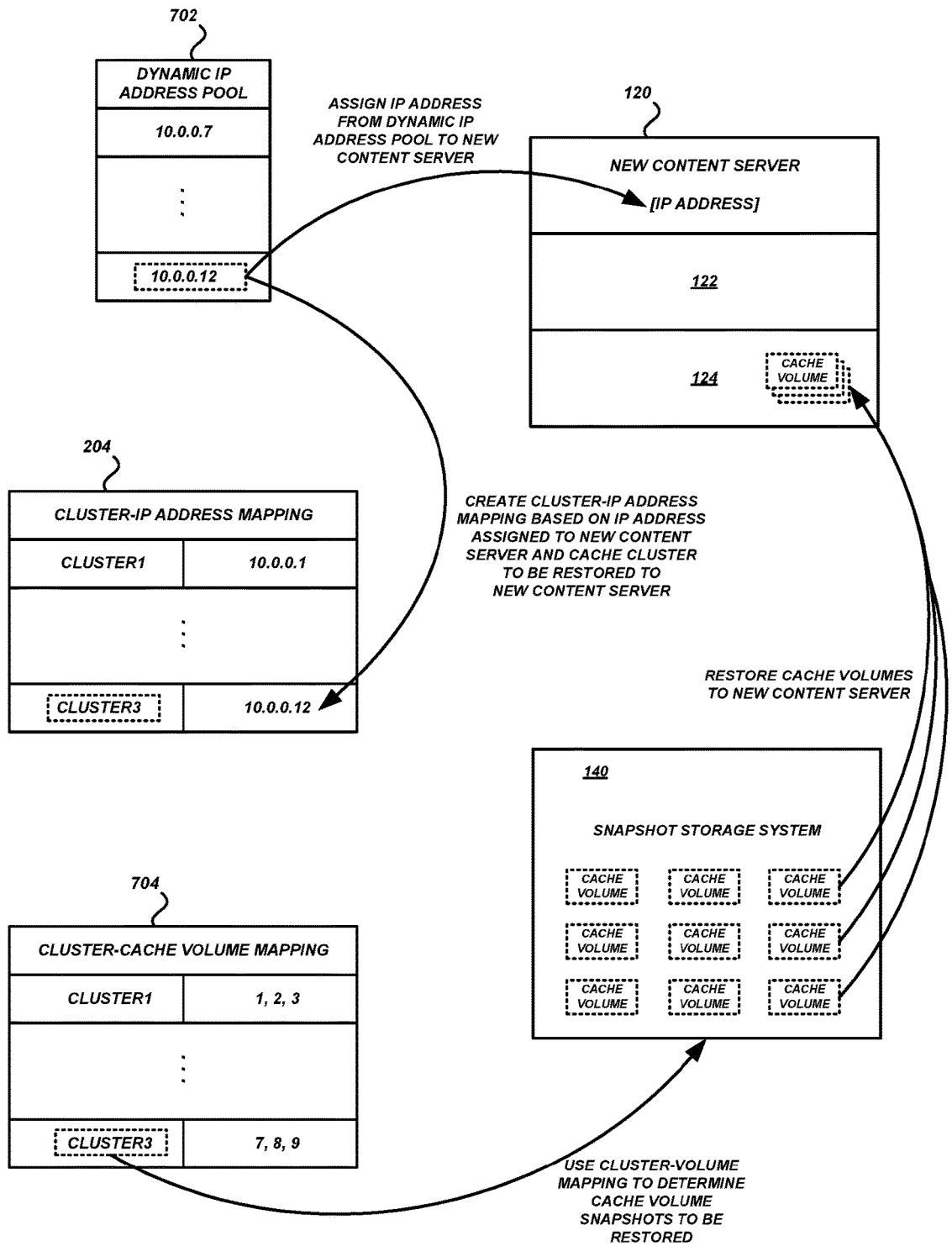
FIG. 7 is a block diagram of illustrative data flows and interactions occurring during dynamic management of a cache fleet according to some embodiments.

At block 606, the scaling manager 130 can assign an IP address to the content server 120. In some embodiments, as shown in FIG. 7, there may be a pool 702 of IP addresses available for content servers 120 of the content delivery system 100. The scaling manager 130 may obtain one of the available IP addresses from the pool 702, and assign the IP address to the content server 120 on which the new server instance 122 has been configured.

At block 608, the scaling manager 130 determine which cache volume(s) to mount to the content server 120. In some embodiments, as shown in FIG. 7, cache-cluster-to-cache-volume mapping data 704 may specify which cache volumes are in the cache cluster to be added. The scaling manager 130 may read the corresponding data (e.g., one or more records) from the cache-cluster-to-cache-volume mapping data 704 to determine which cache volumes are to be mounted to the content server 120. In some embodiments, a single cache volume is to be mounted to the content server 120 rather than a cluster of cache volumes. In such embodiments, there may be no cache-cluster-to-cache-volume mapping data 704, or the scaling manager 130 may not use such data.

At block 610, the scaling manager 130 can mount the determined cache volume(s) to the content server 120. As shown in FIG. 7, snapshots of the determined cache volumes may be obtained from the snapshot data store 140, and the volumes stored in the snapshots can be restored and mounted to the content server 120 to create the content cache 124 used by the content server 120 to service requests for content items associated with the cache cluster.

At block 612, the scaling manager 130 can associate the cache cluster, whose cache volumes have been mounted to the content server 120, with the IP address of the content server 120. In some embodiments, as shown in FIG. 7, IP-address-to-cache-cluster mapping data 706 may be used to record the association between the cache cluster and the IP address of the corresponding content server 120. This association may be used by the request processor 112 to determine the IP address for the content server 120 that is to service a particular content request, such as a request for a content item that may be cached in the content cache 124 of the content server 120. For example, rather than using a mapping function (e.g., hash function) to directly identify the IP address of the content server 120 that is to service a request for a particular content item as discussed above, the request processor 112 can use a mapping function to identify the cache cluster with which the requested content item is associated. Then the request processor 112 can use IP-address-to-cache-cluster mapping data 706 to obtain the corresponding IP address in order to communicate with the content server 120 to which the cache volumes of the cache cluster have been mounted.

The process 600 may terminate at block 614.

Example Computing System Components

Figure 8:
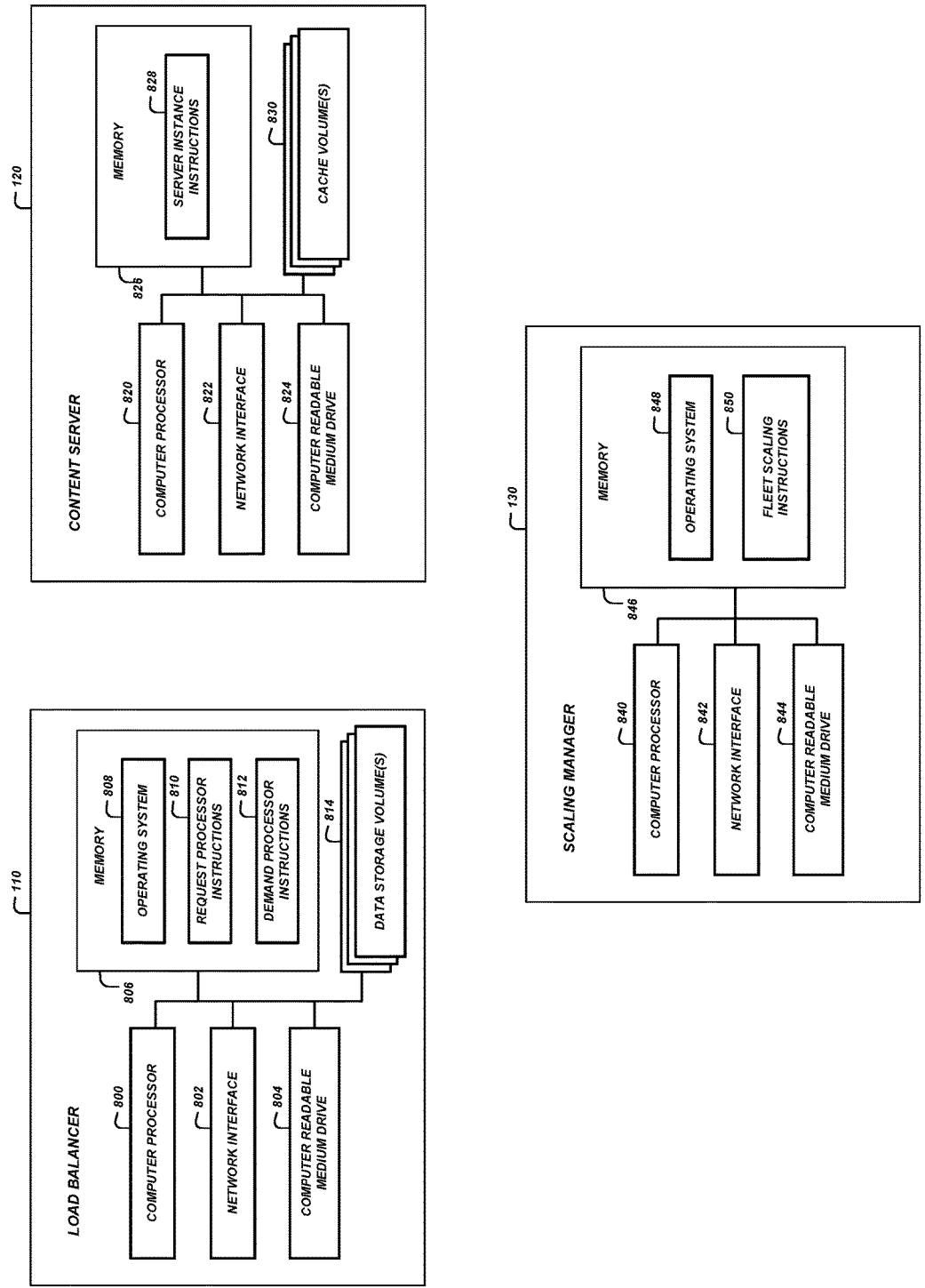
FIG. 8 is a block diagram of various components of a load balancer, fleet scaling manager, and content server according to some embodiments.

FIG. 8 shows components of an illustrative load balancer 110, content server 120, and scaling manager 130.

In some embodiments, as shown, the load balancer 110 may include: one or more computer processors 800, such as physical central processing units ("CPUs"); one or more network interfaces 802, such as a network interface cards ("NICs"); one or more computer readable medium drives 804, such as a high density disk ("HDDs"), solid state drives ("SDDs"), flash drives, and/or other persistent non-transitory computer-readable media; and one or more computer readable memories 806, such as random access memory ("RAM") and/or other volatile non-transitory computer-readable media. The computer readable memory 806 may include computer program instructions that the computer processor 800 executes in order to implement one or more embodiments. For example, the computer readable memory 806 can store an operating system 808 that provides computer program instructions for use by the computer processor 800 in the general administration and operation of the load balancer 110. The computer readable memory 806 may also include request processor instructions 810 for implementing the request processor 112. The computer readable memory 806 may also include demand processor instructions 812 for implementing the demand processor 112. The load balancer 110 may also include one or more data storage volumes 814, such as computer readable medium drives, that store information that supports the operation of the load balancer 110. For example, the cache management data 116 and layer 1 cache 118 may be stored on the data storage volumes 814.

In some embodiments, as shown, a content server 120 may include: one or more computer processors 820, one or more network interfaces 822, one or more computer readable medium drives 824, and one or more computer readable memories 826. The computer readable memory 826 may include computer program instructions that the computer processor 820 executes in order to implement one or more embodiments. For example, the computer readable memory 826 can store server instance instructions 828 (e.g., a virtual machine, operating system, executable server application instructions, etc.) for use in operating the server instance. The content server 120 may also include one or more data storage volumes 830, such as computer readable medium drives, that store information that supports the operation of the content server 120. For example, the content cache 124, and the individual cache volumes that make up the content cache 124, may be stored on the data storage volumes 830.

In some embodiments, as shown, the scaling manager 130 may include: one or more computer processors 840, one or more network interfaces 842, one or more computer readable medium drives 844, and one or more computer readable memories 846. The computer readable memory 846 may include computer program instructions that the computer processor 840 executes in order to implement one or more embodiments. For example, the computer readable memory 846 can store an operating system 848 that provides computer program instructions for use by the computer processor 840 in the general administration and operation of the consumer device 106. The computer readable memory 846 may also include fleet scaling instructions 850 for implementing the scaling features of the content delivery system, such as the processes 300, 400, and 600, or portions thereof.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A content delivery system comprising:
   a content server fleet comprising:
      a first content server comprising a first content cache, wherein the first content server is configured to service requests for content items associated with a first level of demand; and
      a second content server comprising a second content cache, wherein the second content server is configured to service requests for content items associated with a second level of demand lower than the first level of demand; and
   a fleet scaling manager comprising one or more computing devices, wherein the fleet scaling manager is configured to at least:
      determine to reduce a size of the content server fleet based at least partly on a first request volume demand satisfying a reduction criterion;
      determine, based at least partly on the second level of demand being lower than the first level of demand, to remove the second content server from the content server fleet, wherein the first content server is to remain in the content server fleet;
      store a snapshot of the second content cache, wherein the second content cache comprises cached versions of content associated with the second level of demand, and wherein the snapshot comprises the cached versions of content associated with the second level of demand;
      assign the first content server to service requests for content items associated with the first level of demand and requests for content items associated with the second level of demand;
      remove the second content server from the content server fleet; and
      subsequent to removing the second content server from the content server fleet:

determine to increase the size of the content server fleet based at least partly on a second request volume demand satisfying an expansion criterion;

restore the snapshot of the second content cache to a third content server, wherein the third content server comprises the cached versions of content associated with the second level of demand;

add the third content server to the content server fleet; and assign the third content server to service requests for content items associated with the second level of demand.

2. The content delivery system of claim 1, wherein the fleet scaling manager being configured to determine to reduce the size of the content server fleet based at least partly on the first request volume demand satisfying the reduction criterion comprises the fleet scaling manager being configured to determine to reduce the size of the content server fleet according to a scheduled time of low expected request volume demand.

3. The content delivery system of claim 1, further comprising a demand processor comprising one or more computing devices, wherein the demand processor is configured to at least:

analyze request data representing requests for a plurality of different content items; and determine a level of demand, of a plurality of levels of demand, for individual content items of the plurality of different content items based at least partly on results of analyzing the request data.

4. The content delivery system of claim 1, wherein the second content server is configured to service a first request for a content item associated with the second level of demand by responding to the request with a cached version of the content item from the second content cache, and wherein subsequent to removing the second content server from the content server fleet, the first content server is configured to service a second request for the content item by obtaining the content item from an origin server.

5. A computer-implemented method comprising:

under control of a computing system comprising one or more computing devices configured to execute specific instructions, determining a demand level, of a plurality of demand levels, for individual content items of a plurality of content items based at least partly on request data representing requests for the individual content items;

responding to requests for content associated with a first demand level of the plurality of demand levels using a first content server of a content server fleet, wherein the first content server comprises a first cache storing cached versions of content associated with the first demand level;

determining to reduce a size of the content server fleet by removing the first content server from the content server fleet;

generating a snapshot of the first cache, wherein the snapshot is configured to be restored to a new content server to expand the content server fleet; and subsequent to removing the first content server from the content server fleet, responding to requests for content associated with the first demand level and requests for content associated with a second demand level of the plurality of demand levels using a second content server of the content server fleet, wherein the second content server comprises a second cache storing cached versions of content associated with the second demand level.

6. The computer-implemented method of claim 5, wherein determining the demand level for a content item of the plurality of content items is based at least partly a relative ranking of demand for the content item with respect to one or more other content items of the plurality of content items.

7. The computer-implemented method of claim 5, further comprising:

receiving a request for a content item of the plurality of content items;

determining that the content item is associated with the first demand level;

determining an internet protocol ("IP") address of the first content server using a mapping function configured to map the content item to a single IP address of a plurality of IP addresses of content servers associated with the first demand level; and in response to the request, sending a cached version of the content item stored in the first content cache.

8. The computer-implemented method of claim 5, further comprising:

receiving a request for a content item of the plurality of content items;

determining that the content item is associated with the first demand level;

determining a cache cluster associated with the content item using a mapping function configured to map the content item to a single cache cluster of a plurality of cache clusters associated with the first demand level; and determining an IP address of the first content server based at least partly on mapping data that specifies a mapping of the IP address to the cache cluster, wherein the first content server comprises the cache cluster, and wherein the cache cluster comprises the first content cache.

9. The computer-implemented method of claim 5, wherein determining to reduce the size of the content server fleet is based on a scheduled reduction in size of the content server fleet.

10. The computer-implemented method of claim 5, wherein determining to reduce the size of the content server fleet is based on at least one of: an observed volume of content requests, or an expected volume of content requests.

11. The computer-implemented method of claim 5, further comprising:

determining to expand the content server fleet based at least partly on a request volume satisfying an expansion criterion;

restoring the snapshot of the first cache to a third content server, wherein after restoring the snapshot the third content server comprises cached versions of content associated with the first demand level;

adding the third content server to the content server fleet; and assigning the third content server to service requests for content items associated with the first demand level.

12. The computer-implemented method of claim 11, further comprising configuring an IP address of the third content server using at least one of: a pool of available IP addresses, or an IP address assigned to the first cache.

13. The computer-implemented method of claim 11, wherein determining to expand the content server fleet comprises determining to add the third content server and a fourth content server to the content server fleet, and wherein the fourth content server is assigned to service requests for content items associated with a different demand level than the third content server.

14. A system comprising:
a demand processor comprising one or more computing devices, wherein the demand processor is configured to determine a demand level, of a plurality of demand levels, for individual content items of a plurality of content items based at least partly on request data representing requests for the individual content items;
a content server fleet, wherein a first content server of the content server fleet is configured to respond to requests for content associated with a first demand level of the plurality of demand levels, and wherein the first content server comprises a first cache storing cached versions of content associated with the first demand level; and
a scaling manager comprising one or more computing devices, wherein the scaling manager is configured to:
determine to reduce a size of the content server fleet by removing the first content server from the content server fleet;
generate a snapshot of the first cache, wherein the snapshot is configured to be restored to a new content server to expand the content server fleet; and
subsequent to removing the first content server from the content server fleet, configure a second content server of the content server fleet to respond to requests for content associated with the first demand level and requests for content associated with a second demand level of the plurality of demand levels, wherein the second content server comprises a second cache storing cached versions of content associated with the second demand level.

15. The system of claim 14, wherein the demand processor is configured to determine a demand level for a content item of the plurality of content items based at least partly a relative ranking of demand for the content item with respect to one or more other content items of the plurality of content items.

16. The system of claim 14, further comprising a request processor comprising one or more computing devices, wherein the request processor is configured to:
receive a request for a content item of the plurality of content items;
determine that the content item is associated with the first demand level;
determine an internet protocol ("IP") address of the first content server using a mapping function configured to map the content item to a single IP address of a plurality of IP addresses of content servers associated with the first demand level; and
send the request to the first content server.

17. The system of claim 14, further comprising a request processor comprising one or more computing devices, wherein the request processor is configured to:
receive a request for a content item of the plurality of content items;
determine that the content item is associated with the first demand level;
determine a cache cluster associated with the content item using a mapping function configured to map the content item to a single cache cluster of a plurality of cache clusters associated with the first demand level; and
determine an IP address of the first content server based at least partly on mapping data that specifies a mapping of the IP address to the cache cluster, wherein the first content server comprises the cache cluster, and wherein the cache cluster comprises the first content cache.

18. The system of claim 14, wherein the scaling manager is further configured to:
determine to expand the content server fleet based at least partly on a request volume satisfying an expansion criterion;
restore the snapshot of the first cache to a third content server, wherein after restoring the snapshot the third content server comprises cached versions of content associated with the first demand level;
add the third content server to the content server fleet; and
assign the third content server to service requests for content items associated with the first demand level.

19. The system of claim 18, wherein the scaling manager is further configured to configure an IP address of the third content server using at least one of: a pool of available IP addresses, or an IP address assigned to the first cache.

20. The system of claim 14, wherein the scaling manager is configured to determine to reduce the size of the content server fleet based on at least one of: an observed volume of content requests, or an expected volume of content requests.

* * * * *